Sept. 7, 1926.  
W. S. DANIELS  
FLOWER HOLDER  
Filed May 13, 1926

1,599,320

WITNESSES

INVENTOR  
WALTER S. DANIELS  
BY  
ATTORNEYS

Patented Sept. 7, 1926.

1,599,320

UNITED STATES PATENT OFFICE.

WALTER S. DANIELS, OF WHITE PLAINS, NEW YORK.

FLOWER HOLDER.

Application filed May 13, 1926. Serial No. 108,964.

This invention relates to flower holders for use in arranging and positioning flowers in bowls or other receptacles and has for an object to provide an improved construction over my prior Patent No. 1,081,097.

Another object of the invention is to provide a flower holder wherein a plurality of rods are provided and arranged so that the stems of the flowers may be disposed therebetween so as to support the flowers in a desired position, the rods presenting smooth rounded upper end sections whereby they will not injure the fingers of the person arranging the flowers.

A further object, more specifically, is to provide a flower holder for bowls and the like wherein rods bent upon themselves are provided with the rounded or bent sections uppermost, the rods being arranged in a grouped formation so as to hold in a cluster flowers arranged therein.

In the accompanying drawing—

Figure 1:
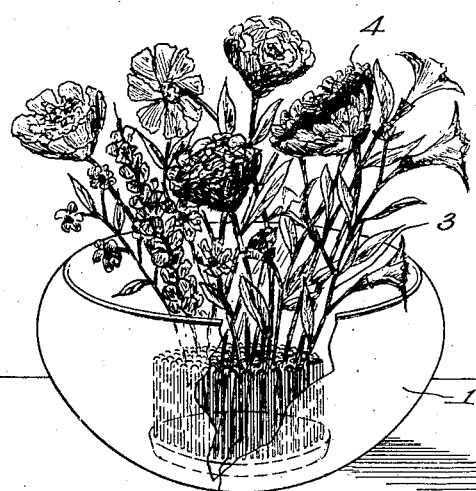
Figure 1 is a perspective view of a bowl with a flower holder embodying the invention arranged therein, the flower holder having a bunch of flowers associated therewith.
Figure 3:
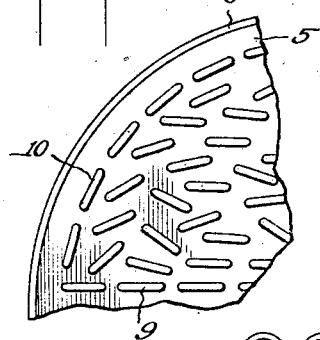
Figure 3 is a fragmentary top plan view showing part of the structure illustrated in Figure 2.
Figure 2:
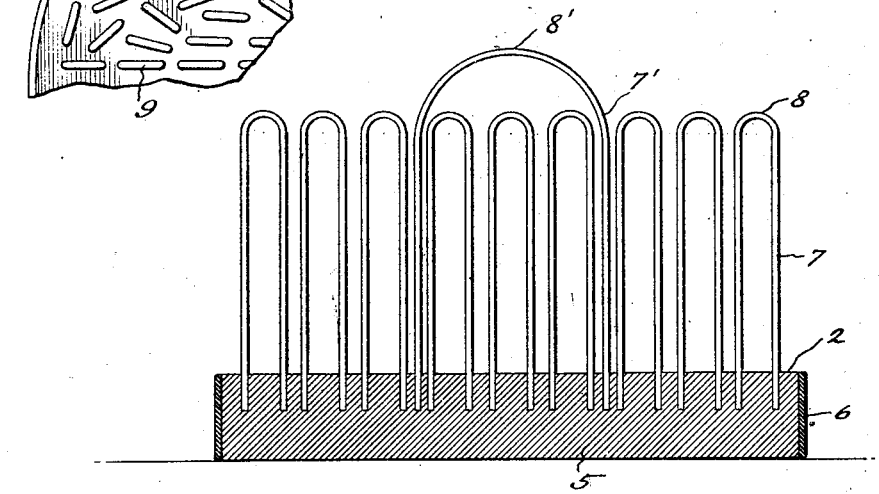
Figure 2 is an enlarged vertical sectional view approximately through the center of the holder shown in Figure 1, the rear portion being omitted for the sake of clearness.

Referring to the accompanying drawing by numerals, 1 indicates a bowl in which the holder 2 is adapted to be located. The holder 2 is adapted to receive the stems 3 of flowers 4 and hold the flowers in substantially any desired arrangement. The holder 2 is formed with a body or bed 5 of cement or other desired material, the same being surrounded by a metallic band 6 whereby any chipping of the edge of the base 5 will be prevented. Associated with the base 5 are a number of rods 7 which are bent so as to present U-shaped structures with the rounded upper ends or sections 8 arranged substantially in the same plane. One of the rods, namely, rod 7', is made larger and the rounded upper end or section 8' presents a handle whereby the device may be moved from place to place.

In arranging the rods 7 in the base 5, they may be regularly arranged as indicated by the central line 9 of rods 7 or they may be arranged haphazard. Preferably, the outer row 10 is arranged in an even manner so that if the base 5 is circular, the outer row 10 will be in the form of a circle whereas if the base 5 is square or some other shape, the outer row 10 will follow the outer shape of the base 5. The rods 7 are preferably of metal which may be bent if desired but which will normally flex more or less and in that way permit the ready disposition of the stems 3. It is also evident that the base 5 could be made of any desired size as well as the rods 7 and that any desired number of rods 7 may be associated with any base.

Preferably, the entire structure is comparatively heavy and also comparatively small so as to readily fit in a vase or bowl of medium size and by reason of the weight, remain submerged even if the bowl is completely filled with water. In this way the device is almost shut off from sight but efficiently holds the flowers in a desired grouping. To make the device more pleasing, the same may be painted green or any other desired color. Instead of using cement for the base 5, plaster of Paris could be used or lead or other material without in any way departing from the spirit of the invention.

What I claim is:

1. A flower holder comprising a non-floating base adapted to stand upon the bottom of a vessel, and a plurality of rods having their lower ends attached to said base, the upper ends projecting above the surface of said base and having predetermined normal positions relative to one another, said rods being substantially evenly distributed within the periphery of the upper surface of said base and being formed of pliable material, each of said rods being bent upon itself to present a U-shaped structure with the rounded portion spaced farthest from the base.

2. A flower holder comprising a base, a plurality of grouped U-shaped rods having one end embedded in the base and the bent or rounded ends spaced from the base and arranged substantially in the same plane whereby the fingers of a person will not be injured when placing the stems of flowers between the various rods.

3. A flower holder comprising a base, a series of flower receiving rods mounted on the base, and a substantially U-shaped rod connected with the base with the rounded end spaced above the other rods and acting as a handle for the entire device.

4. A flower holder comprising a base formed of material having substantially the characteristics of cement, a metal band fitted on the periphery of the base for preventing chipping, and a series of substantially U-shaped rods carried by the base, the rounded ends of the rods being spaced from the base.

WALTER S. DANIELS.